May 28, 1963 H. VERSE 3,091,692

APPARATUS FOR TOMOGRAPHIC FLUOROSCOPY
WITH THE USE OF IMAGE AMPLIFICATION

Filed Aug. 25, 1954 6 Sheets-Sheet 1

INVENTOR
HANSHEINRICH VERSE
BY Fred M. Vogel
AGENT

May 28, 1963 H. VERSE 3,091,692

APPARATUS FOR TOMOGRAPHIC FLUOROSCOPY
WITH THE USE OF IMAGE AMPLIFICATION

Filed Aug. 25, 1954 6 Sheets-Sheet 2

INVENTOR
HANSHEINRICH VERSE

BY Fred M. Vogel
AGENT

INVENTOR
HANSHEINRICH VERSE
BY Fred M. Vogel
AGENT

INVENTOR
HANSHEINRICH VERSE
BY Fred M. Vogel
AGENT

INVENTOR
HANSHEINRICH VERSE
BY Fred M. Vogel
AGENT

May 28, 1963 H. VERSE 3,091,692

APPARATUS FOR TOMOGRAPHIC FLUOROSCOPY
WITH THE USE OF IMAGE AMPLIFICATION

Filed Aug. 25, 1954 6 Sheets-Sheet 6

INVENTOR
HANSHEINRICH VERSE

BY Fred C. Vogel

AGENT

United States Patent Office 3,091,692

Patented May 28, 1963

3,091,692

APPARATUS FOR TOMOGRAPHIC FLUOROSCOPY WITH THE USE OF IMAGE AMPLIFICATION

Hansheinrich Verse, Hamburg-Fuhlsbuttel, Germany, assignor, by mesne assignments, to North American Philips Company, Inc., New York, N.Y., a corporation of Delaware Filed Aug. 25, 1954, Ser. No. 452,024
Claims priority, application Germany Nov. 14, 1953
3 Claims. (Cl. 250—61.5)

Apparatus of various kinds are known enabling radiographs of sectional planes to be made. The said apparatus usually operates with an X-ray tube and a film slide moving according to the laws of tomography whilst the object is stationary. However, such apparatus is not suitable for direct observation with the aid of a normal fluorescent screen. Apart from the inadmissibly large dose of radiation various difficulties would be met with. The fluorescent screen would show a large but very weak and also moving image.

It is true that there are means for observing such a moving image from a stationary point but this requires a huge optical arrangement operating with excessive luminous losses.

The invention is based on the consideration that the use of the image amplifier (luminoscope), due to the high brilliance of the image amplified with its aid and the low intensity of the X-ray radiation which this apparatus requires and which permits of prolonged irradiation, allows of tomographic fluoroscopy (tomoscopy).

In an X-ray apparatus for use in tomoscopy according to the invention a luminoscope amplifying the X-ray image is connected through a system of viewing tubes which is adapted to be moved and may be telescoping to the eye-piece the viewing direction of which is independent of the tomographic motion. If required, the eye-piece may be displaceable in space but this displacement also is independent of the tomographic motion.

The optical systems joining the image amplifier and the ocular are designed such that the final image does not rotate on tomographic movement. Suitable optical joints are known per se. They may consist, for example, of two semi-cubical prisms, and König's refracting prisms may also be used. The invention may be realised in various manners according to the various structural embodiments of tomographic apparatus.

Figure 5:
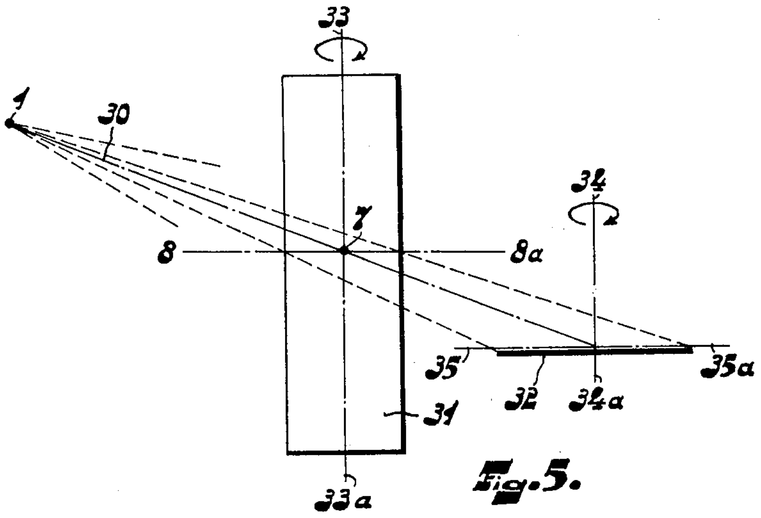
Figure 5A:
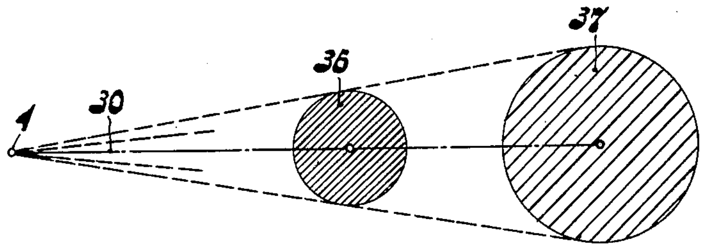
Figure 6:
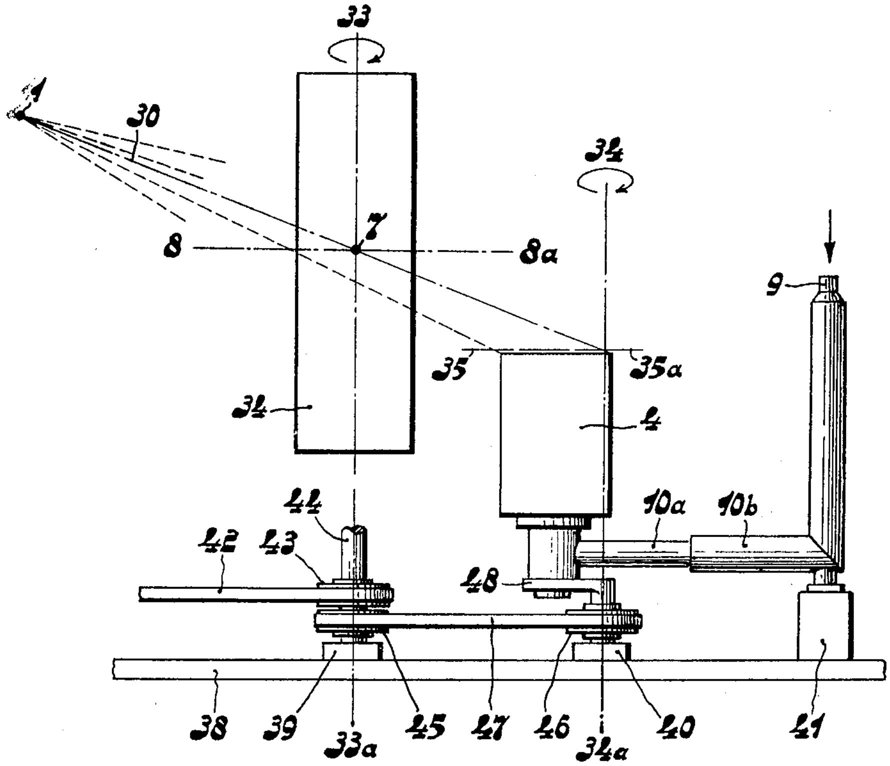
Figure 6A:
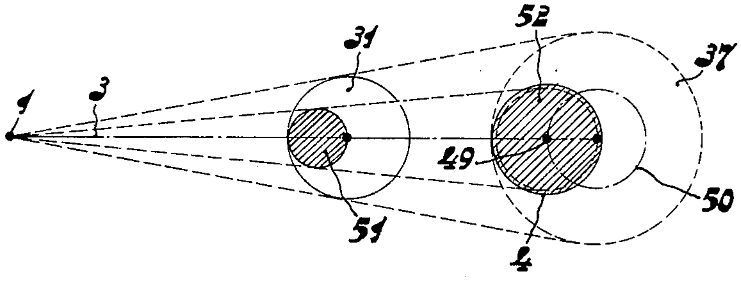

FIGS. 5 and 5*a* are diagrammatic views of another embodiment of the present invention, and FIGS. 6 and 6*a* are views of still another embodiment of the present invention.

Figure 1:
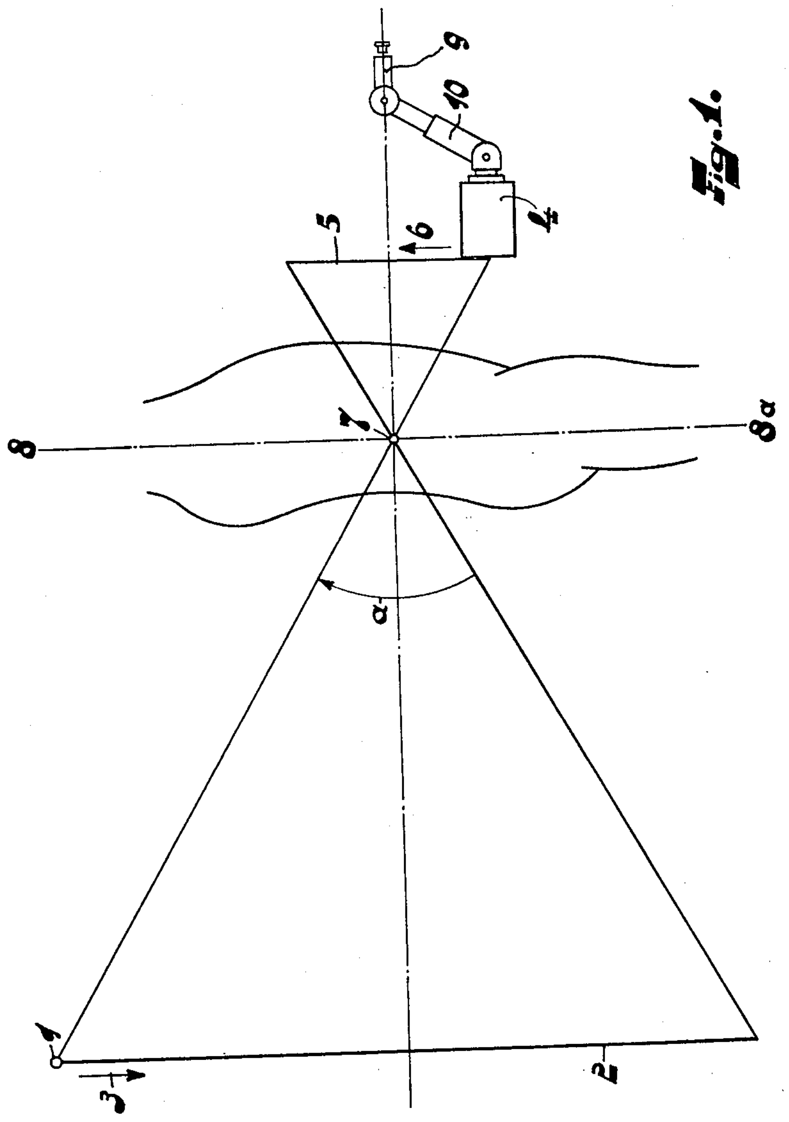
FIG. 1 is a diagrammatic representation of the principle behind the present invention.

The simplest kind of tomographic arrangement operates with linear motion and blurring in only one direction. FIG. 1 shows a manner of realizing the invention in an arrangement of this kind. As an example has been chosen fluoroscopy of a standing patient shown sideways in the figure. By means of a known actuating mechanism the focal spot 1 of the X-ray tube is moved along the path 2 in the direction of the arrow 3 for tomoscopy. The image amplifier 4 is simultaneously moved along the path 5 in the direction of the arrow 6 in a manner such that the straight line joining the focal spot with the centre of the pick-up screen of the image amplifier invariably passes through the same point 7 of the object and consequently rotates about this point through an angle $\alpha$. As a result the X-rays produce a skiagraph of the vertical cross-section 8—8*a* through the object on the pick-up screen.

If a film slide were arranged in the position of the image amplifier 4, the film would show after completion of the tomographic motion an additive image of every thing which during this movement has cast a shadow on the film, that is to say a background blurred by addition and a sharp image of the sectional plane 8—8*a*.

In tomoscopy there are two possibilities. The movement may be so slow that the eye sees a sharp image of the plane 8—8*a* against a background moving slowly past it. In the other case the velocity of movement is made so high that due to the inertia of the eye the movement of the background is no longer observed and only the image of the sectional plane is sharply defined. In this latter case the provision of a tomographic actuating arrangement is required which produces a continuous path without turning points inter alia to avoid undesired inertia forces acting upon the X-ray tube and the luminoscope. In this case the path of the movement must be circular or elliptical. Tomographic apparatus in which the movement is effected along such paths are also known.

In FIG. 1 a stationary eye-piece 9 contains the ocular and is connected to the image amplifier 4 by means of a telescoping viewing tube 10. Such optical connections in combination with an X-ray image amplifier have been proposed before. However, the possibility of examining sections through a body which are not vertical is also required. For this purpose the tomographic actuating arrangement shown in FIG. 1 may be arranged on a tilting couch.

Figure 2:
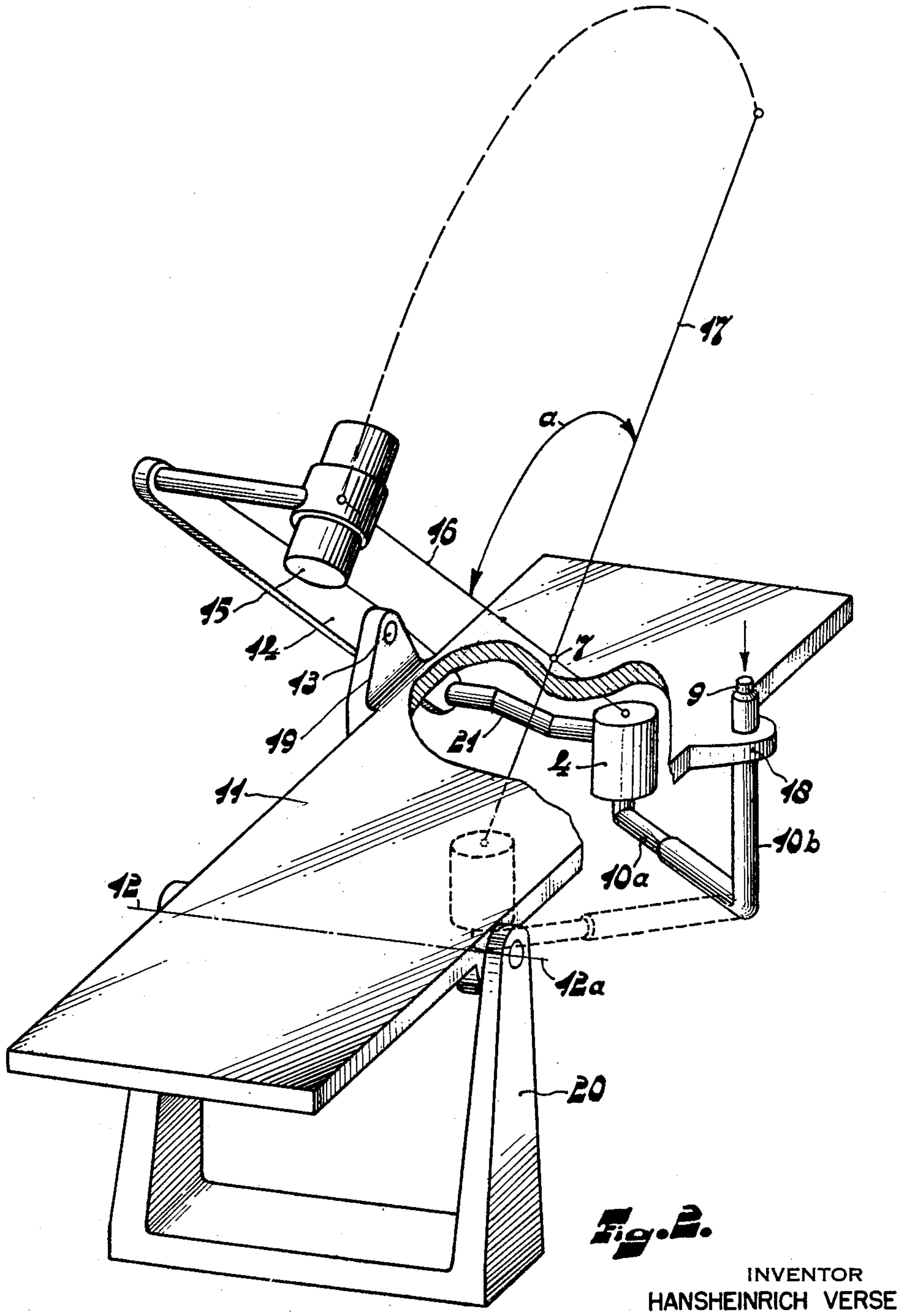
FIG. 2 is a perspective view of the X-ray apparatus constructed in accordance with the teachings of the present invention.

FIG. 2 shows the construction of such an apparatus according to the invention. A table 11 for supporting the patient and supported from a base 20 is adapted to rotate about an axis 12—12*a*. Means for rotating the table and fixing it at the required position may be constructed in known manner. At one longitudinal side the table 11 is provided with a bracket 19 comprising a journal 13 about which a two-armed lever 14 pivots. The height of the journal 13 above the table determines the position of the sectional plane. The journal may be raised or lowered in a known manner. The lever 14 at one end carries the X-ray source 15 and at the other end a catch 21. This catch causes the luminoscope 4 to reciprocate along a guide face which should be conceived as secured to the bottom of the table 11. The arrangement which is known per se for actuating the lever 14 is not shown in the drawing for the sake of clarity. Let it be assumed that at the beginning of the tomographic motion the axis of the conical X-ray beam occupies the position indicated by the line 16 and that it swings into the position indicated by the line 17 through an angle $\alpha$ during this motion. The optical connection between the stationary eye-piece 9 and the image amplifier consists of a viewing tube 10*a* which is bent at right angles and is adapted to rotate about the axis of the image amplifier, and of a viewing tube 10*b* which is also bent at right angles and adapted to rotate in the projecting part 18 of the table. At the corners the telescoping tubes 10*a* and 10*b* contain optical refracting systems (prisms or mirrors).

The bracket 12 may also be displaceable along the table. The centre of movement 7 can in this event be displaced relatively to the patient. In this case the projecting part 18 must be coupled to the bracket 19 and the guide face of the luminoscope arranged at the bottom of the table must be longer.

Figure 3:
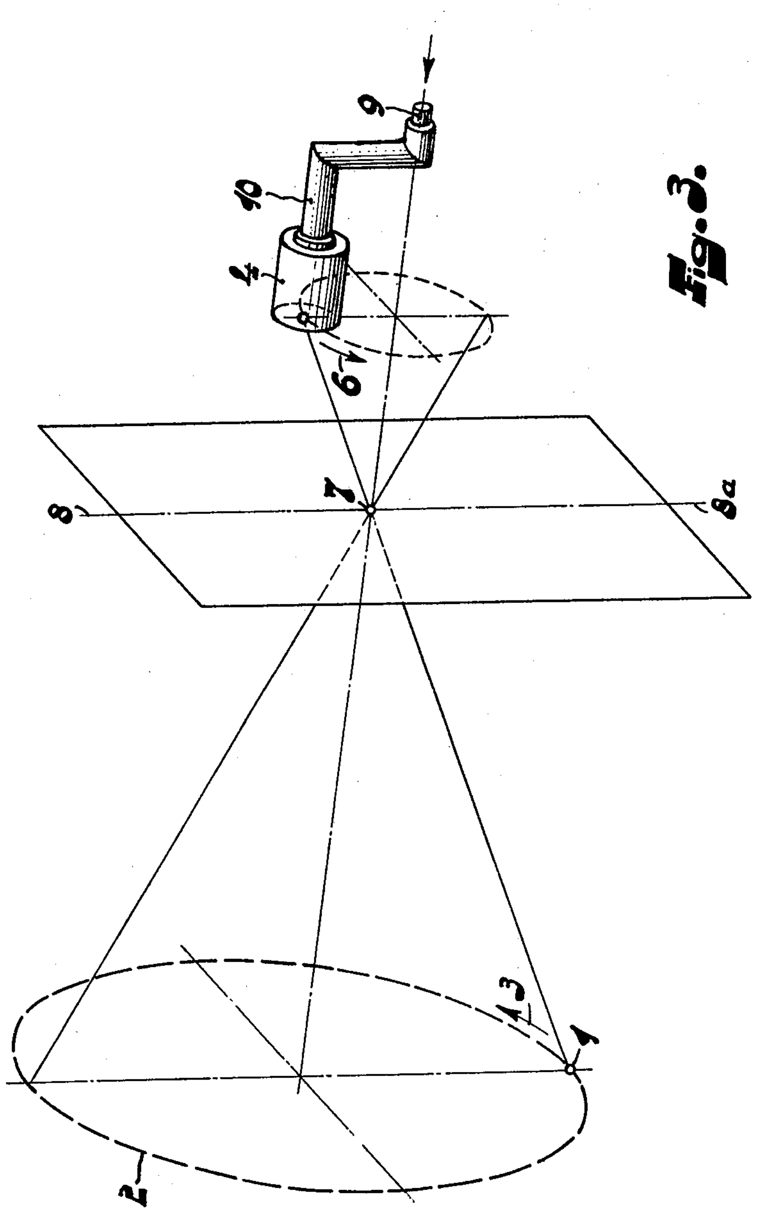
FIG. 3 is a partial perspective and partial diagrammatic view of an arrangement equivalent to that shown in FIG. 1 but travelling along a circular or elliptical path.

FIG. 3 is a diagram of an arrangement equivalent to that shown in FIG. 1 travelling along a circular or elliptical path. Corresponding elements of this arrangement are designated similarly to those shown in FIG. 1.

Figure 4:
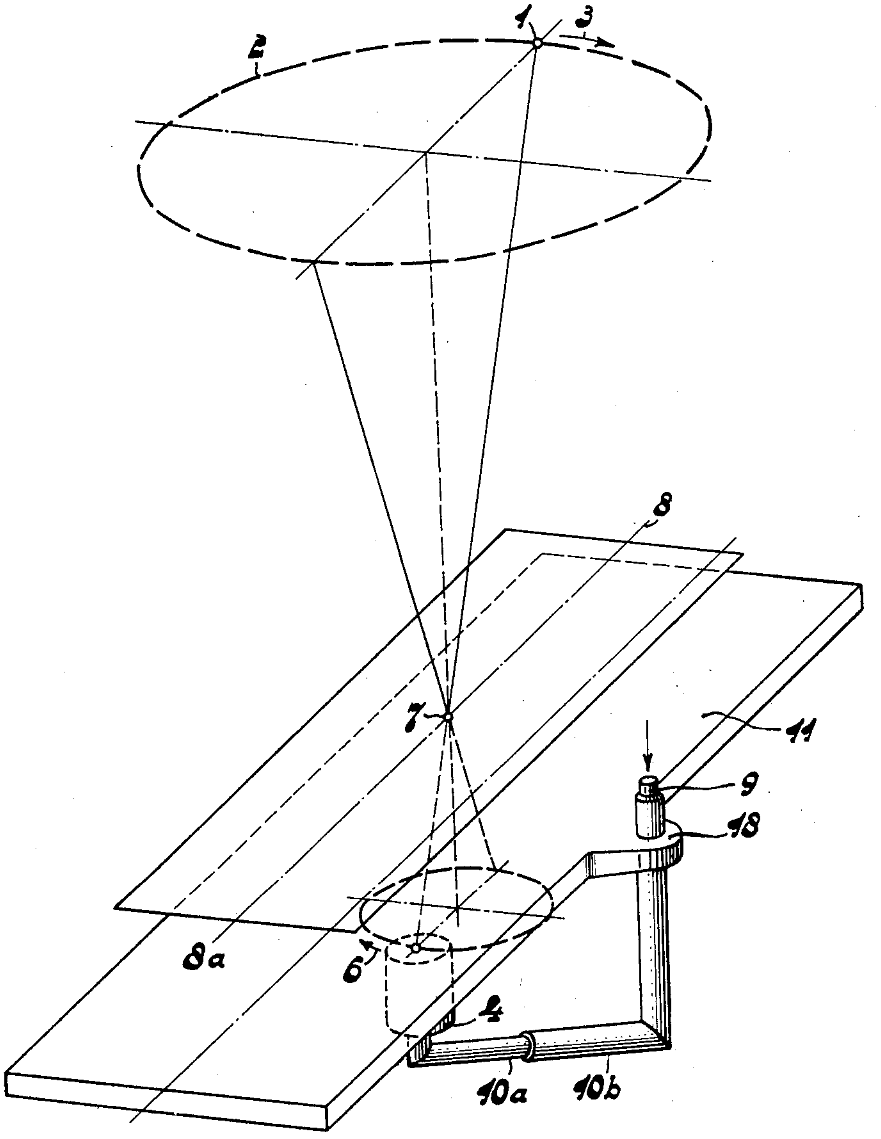
FIG. 4 is a perspective view of an X-ray apparatus constructed in accordance with the principles of FIG. 3.

FIG. 4 shows the manner in which the principle illustrated in FIG. 3 may be used in an apparatus of the kind shown in FIG. 2. It will be appreciated that in all the described arrangements the viewing tube system may be provided with a so-called optical switch to which a camera may be connected.

Apart from the above-described arrangements, which operate with a moving X-ray source and a stationary object, apparatus for use in tomography are known which operate with a stationary X-ray source and a moving object. In these arrangements the film also is moved. Such an arrangement is shown diagrammatically in FIGS. 5 and 5*a*. From the stationary focal spot 1 an X-ray beam emerges the axis of which is designated 30. This beam passes through the body 31 under examination and thereupon impinges on the photographic film 32. If the body 31 rotates about the axis **33—33*a* and the film follows this rotary motion in synchronism and in the same sense about the axis 34—34*a*, an image of the section 36 through the body in the plane 8—8*a* is projected onto the plane 35—35*a*** of the film.

The invention can also be used with this manner of tomographic motion. FIGS. 6 and 6*a* illustrate a method which permits of using a small luminoscope the diameter of which is not large enough to include an image of the entire section 37.

A base plate 38 carries step bearings 39, 40, and 41. The body 31 required to be examined is rotated about the axis **33—33*a* by means of a motor (not shown), a driving chain 42 and a chain wheel 43. The body 31 is rotated by means of a shaft 44 journalled in the step bearing 39**. The further supports of this shaft are not shown.

The rotary motion about the axis **33—33*a* is transmitted in synchronism and in the same sense to a crank 48 by means of the chain wheels 45 and 46 and the driving chain 47. The journal of the crank situated in the axis 34—34*a* is supported in the step bearing 40. At its free end the crank carried the luminoscope 4. This is provided with telescoping viewing tubes 10*a* and 10*b* which end in the eye-piece 9 containing the ocular. The tube 10*b* is adapted to rock about the axis of the vertical part in the step bearing 40. If the apparatus is actuated by means of the chain 42, the luminoscope rotates about the axis 34—34*a* in a manner such that the centre 49 of its pick-up screen travels along the path 50 about the axis 34—34*a*. On this screen the image 52 of the section 51 through the body is produced, which section is situated in the horizontal plane 8—8*a***.

Before the apparatus is actuated the body 31 required to be examined has to be rotated about the axis **33—33*a* without the image amplifier following this movement, until that part of the section situated in the plane 8—8*a*** which is of interest falls into the image field of the luminoscope. Only then the axes **33—33*a* and 34—34*a*** can be intercoupled.

What is claimed is:

1. An X-ray apparatus for use in tomoscopy comprising an X-ray source, means moving said X-ray source in accordance with tomographic motion, a table adapted to accommodate a person to be X-rayed, means for rotating said table in a selected plane relative to the X-ray source and within the path of the X-rays, the rotational movement of said table being stopped at a selected position and the X-ray source moved in accordance with tomographic motion, a luminoscope operatively connected to said X-ray source, and a movable viewing tube system connected to said luminoscope, said movable viewing tube system including an ocular, said viewing tube system being moved only when said table has stopped rotating and the movement thereof is separate from the plane of movement of said table, and the direction of viewing through said ocular being independent of said tomographic motion.

2. An X-ray apparatus for use in tomoscopy as claimed in claim 1 further comprising optical connecting means between the luminoscope and said ocular for preventing the rotation of the image during tomographic motion.

3. An X-ray apparatus for use in tomoscopy comprising an X-ray source, means moving said X-ray source in accordance with tomographic motion, a table adapted to accommodate a person to be X-rayed, means for rotating said table in a selected plane relative to the X-ray source and within the path of the X-rays, the rotational movement of said table being stopped at a selected position and the X-ray source moved in accordance with tomographic motion, a luminoscope operatively connected to said X-ray source, and a movable viewing tube system connected to said luminoscope, said movable viewing tube system including a plurality of viewing tubes which are adapted for movement which will change the overall length of said viewing system and an ocular, said viewing tube system being moved only when said table has stopped rotating and the movement thereof is separate from the plane of movement of said table, and the direction of viewing through said ocular being independent of said tomographic motion.

References Cited in the file of this patent

UNITED STATES PATENTS

| | | |
|---|---|---|
| 2,055,188 | Wappler et al. | Sept. 22, 1936 |
| 2,110,954 | Grossman | Mar. 15, 1938 |
| 2,158,853 | Coolidge | May 16, 1939 |
| 2,196,618 | Watson | Apr. 9, 1940 |
| 2,207,867 | Loebell | July 16, 1940 |
| 2,537,373 | Rosenberg | Jan. 9, 1951 |
| 2,667,585 | Gradstein | Jan. 26, 1954 |
| 2,760,077 | Longini | Aug. 21, 1956 |